E. E. MILLER.
SHIELD FOR WHEELS.
APPLICATION FILED JAN. 3, 1920.
1,351,261.
Patented Aug. 31, 1920.
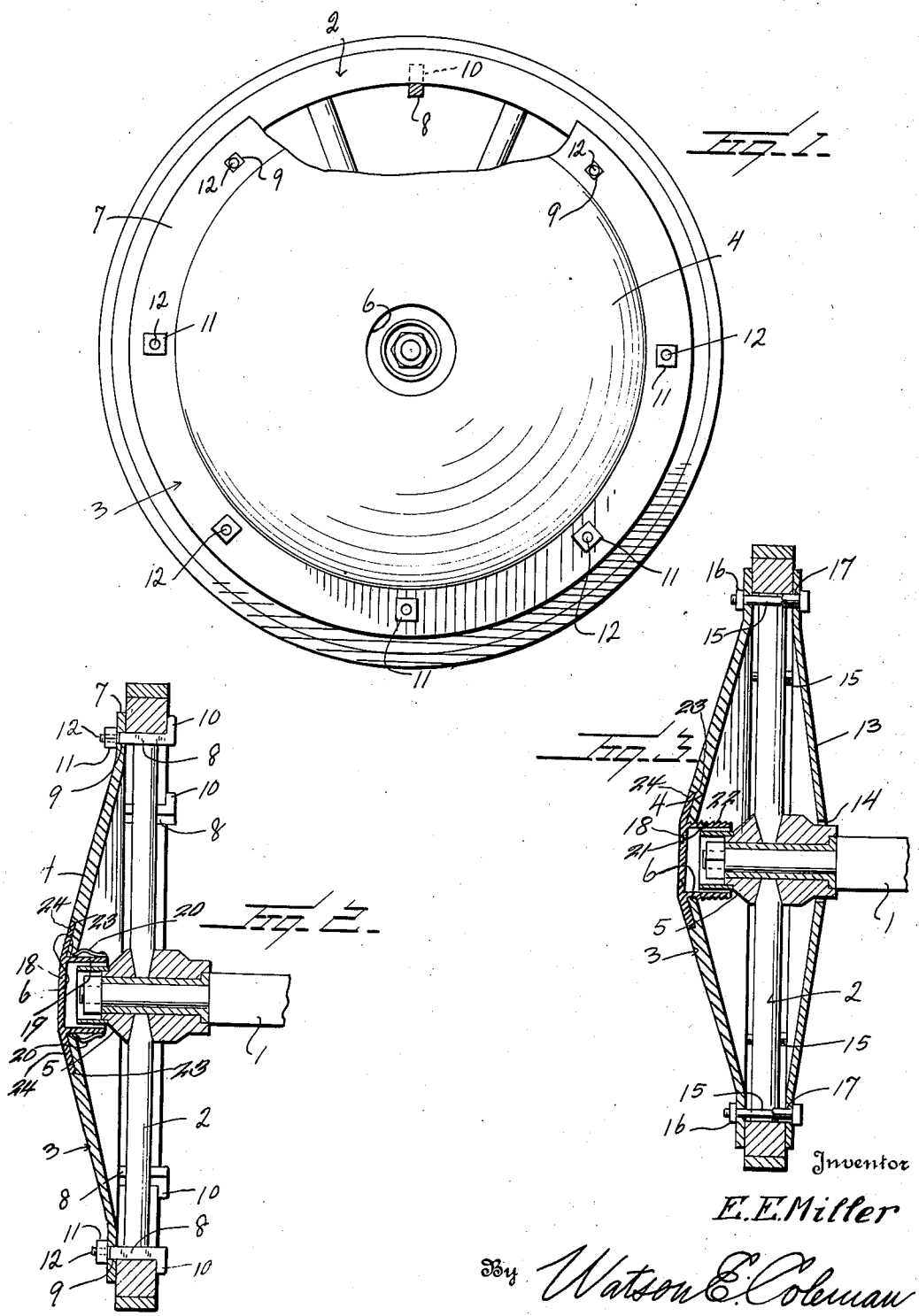
Inventor
E. E. Miller
By Watson E. Coleman
Attorney

UNITED STATES PATENT OFFICE.

EDWIN E. MILLER, OF TYRONE, PENNSYLVANIA.

SHIELD FOR WHEELS.

1,351,261. Specification of Letters Patent. Patented Aug. 31, 1920.

Application filed January 3, 1920. Serial No. 349,169.

*To all whom it may concern:*

Be it known that I, EDWIN E. MILLER, a citizen of the United States, residing at Tyrone, in the county of Blair and State of Pennsylvania, have invented certain new and useful Improvements in Shields for Wheels, of which the following is a specification, reference being had to the accompanying drawings.

This invention relates to an improved shield for wheels, and an object of the invention is to provide opposing shields or plates for the opposite side of a vehicle wheel, to cover and protect the spokes thereof.

Another object of the invention is to provide a shield particularly adapted for the outside of the wheel, and means for detachably connecting the shield or plate to the felly of the wheel.

Very often the wheels of vehicles are broken in accidents caused by the contacting of passing vehicles, or by the wheels engaging a post or other obstruction on the side of the road, therefore, a further object of the invention is to provide a shield for obviating the breaking of the wheels, particularly the spokes.

Further, it is the aim to provide a shield consisting of a plate of substantially conical shape to fit upon the outside of the wheel concentrically therewith, in order to deflect or cam the wheels of other vehicles therefrom, so as to permit the vehicles to pass one another, without damaging the wheels or permitting the wheels to lock.

A still further object of the invention is to provide novel means for fastening the shield or plate to the wheel whereby it may be easily and quickly detached.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a conventional form of vehicle wheel showing the improved shield or plate connected thereto and concentric therewith.

Fig. 2 is a vertical sectional view through the wheel, and showing the shield or plate fastened in position over the hub of the wheel adjacent the outside thereof.

Fig. 3 is a vertical sectional view through a wheel showing opposing shields or plates adjacent the opposite sides of the wheel.

Referring more especially to the drawings, 1 designates a usual axle on which a conventional form of vehicle wheel 2 is mounted. Referring to Figs. 1 and 2 it will be noted that a shield or circular plate is disposed adjacent the outer side of the wheel. This plate 3 is outwardly dished in conical form as indicated at 4, so as to fit over the laterally projecting portion 5 of the wheel. The apex of the conically dished portion of the shield is provided with a concentric opening 6, through which a wrench may be inserted, so as to attach or remove the nut from the axle, to permit the removal of the wheel. The conically dished portion of the shield or plate merges into a marginal radial portion or flange 7, which lies against the outside face of the felly of the wheel. Retaining bolts 8 pass through openings 9 of the radial portion or flange 7, and are provided with angular ends 10, which overlie the inner side or face of the felly.

The openings 9 are square or rectangular in form and so are the shanks of the bolts correspondingly formed in cross section to engage the openings so as to prevent turning of the bolts. However, the rectangular portions of the bolts do not extend entirely through the plates, but sufficiently to permit the nuts 11, which are threaded upon the cylindrical reduced extensions 12 of the shanks, to be turned or adjusted tightly home so as to draw the right angular lugs or arms 10 in contact with the inner side or face of the felly to hold the shield or plate securely in position.

In Fig. 3 an additional plate 13 is arranged adjacent the inner side of the wheel, and this additional plate is provided with a concentric opening 14 through which the inner end of the hub of the wheel projects. The securing bolts 15 pass through the radial parts or flanges of both plates, and are provided with nuts 16 on their outer ends to clamp the plates in position. The additional plate is also conically dished, but just the opposite to the outside plate. In this construction the openings 17 of the additional plate through which the securing bolts 15 pass are rectangular, so that the rectangular parts of the securing bolts 15 will not turn, instead of making the openings of the outer plate rectangular.

A cap 18 is designed for closing the opening 6 of the outer plate 3. The outer plate or disk 3 has a counter-sink 23 in surrounding relation to the opening 6, to receive the flange 24 of the cap. The object in countersinking the flange 24 is to prevent an object that may contact upon the outer surface of the plate 3 to deflect it, will not be obstructed in its sliding contact with the outer face of the plate. In Fig. 2 the cap 18 has an inwardly extending annular flange 19, which extends through the opening 6 of the plate 3 and telescopes the hub of the wheel. The outer surface of the flange 19 is provided at intervals, say for instance, at four different points, though not necessarily, with leaf springs 20. These springs 20 have certain of their ends free and unattached, and are bowed as illustrated so as to contact with the inner surface of the plate or disk 3, in order to hold the cap securely in position.

In Fig. 3 the cap 18 also has its flange 24 countersunk in the countersink 23 of the outer plate or disk 3 of the guard. Also the cap has an inwardly extending annular flange 21, which extends through the opening 6, and also telescopes the hub of the wheel. This flange is provided with exterior threads 22, in order to thread with the wall of the opening 6 thereby securely holding the cap in place. By means of the cap in both instances shown in Figs. 2 and 3 dust is prevented from reaching the hub of the wheel. In Fig. 1 the cap 18 is omitted.

The invention having been set forth, what is claimed as new and useful is:—

In a device as set forth, a vehicle wheel, a shield plate conically dished and arranged adjacent one face of the wheel and having its marginal portion detachably secured to the felly of the wheel, the central portion of the conically dished shield plate having an opening axially alined with the hub of the wheel, the outer face of the shield plate in surrounding relation to the opening being rabbeted, a cap plate countersunk in the rabbet of the shield plate and provided with a cylindrical flange telescoping through the opening, and over the hub, and spring fasteners carried by the cylindrical flange and engaging the marginal wall of the opening of the conically dished shield to retain the cap in position.

In testimony whereof I hereunto affix my signature.

EDWIN E. MILLER.